United States Patent [19]
Staut et al.

[11] 3,974,108
[45] Aug. 10, 1976

[54] LaCrO$_3$ ELECTRODES AND METHOD OF MANUFACTURE

[75] Inventors: Ronald Staut; Peter E. D. Morgan, both of Cherry Hill, N.J.

[73] Assignee: General Refractories Company, Bala Cynwyd, Pa.

[22] Filed: Nov. 19, 1974

[21] Appl. No.: 525,064

[52] U.S. Cl. .............................. 252/521; 252/518; 310/11
[51] Int. Cl.$^2$ ............................................. H01B 1/08
[58] Field of Search ............. 252/521, 518; 310/11; 106/66

[56] References Cited
UNITED STATES PATENTS

| | | | |
|---|---|---|---|
| 3,630,968 | 12/1971 | Hamano et al. | 310/11 X |
| 3,686,519 | 8/1972 | Blattmann et al. | 310/11 |

OTHER PUBLICATIONS

Energy Conversion, vol. 12, pp. 145–147, "Hot Ceramic Electrodes for Open–Cycle MHD Power Generation," Meadowcroft et al.

*Primary Examiner*—Benjamin R. Padgett
*Assistant Examiner*—E. Suzanne Parr
*Attorney, Agent, or Firm*—Everett H. Murray, Jr.

[57] ABSTRACT

A technique of forming electrodes for magneto-hydrodynamic generators having the composition $(La_{1-x}Y_x)CrO_3$ where Y is strontium, calcium or magnesium and having densities of as high as 97% of theoretical or even higher is provided. Electrodes of such densities offer superior mechanical and electrical properties when employed in magneto-hydrodynamic generators.

4 Claims, No Drawings

LACRO₃ ELECTRODES AND METHOD OF MANUFACTURE

This application relates to the preparation of highly electrically conducting oxide materials. More particularly, it relates to the preparation of electrically conducting electrodes appropriate for use in high temperature applications, and still more particularly to electrodes for utilization in a magneto-hydrodynamic generator.

Magneto-hydrodynamic generation of electrical energy (MHD) converts thermal energy to electrical energy by passing a high velocity, alkali seeded plasma through a magnetic field and picking up electric current with electrodes projecting into the flow. The requirements for the electrodes are quite severe, since they must withstand high temperatures, on the order of 1500°–2300°C., abrasion, thermal shock, and alkali attack. Conductivity must be very high to minimize losses.

A material which in theory should meet all these diverse criteria is alkaline earth doped lanthanum chromite. The desired and theoretically attainable characteristics have not heretofore been achieved, however, since it has proved impossible to attain densities of the composition, by sintering, sufficient to develop the theoretical capacities of the composition.

It is accordingly an object of the present invention to provide sintered lanthanum chromite or strontium, or calcium or magnesium doped lanthanum chromite electrodes having a density greater than about 90% of theoretical, and preferably greater than about 95% of theoretical. Still another object is to provide a simple, economical method of producing such electrodes.

These and still other objects to become apparent from the following disclosures are attained by the present invention.

It has been found that superior MHD electrodes of strontium or calcium or magnesium doped lanthanum chromite having the formulas $(La_{1-x}Sr_x)CrO_3$, $(La_{1-x}Ca_x)CrO_3$, $La_{1-x}Mg_x)CrO_3$ or $La_1Mg_xCr_{1-x}O_3$ wherein $x$ is 0 to 0.3, and having high density approaching theoretical are attained by the following procedure:

A strong aqueous solution of chromic acid is formed and with vigorous stirring employed, lanthanum oxide and strontium, calcium, or magnesium carbonate, hydroxides or oxides, in appropriate proportions, dissolved and reacted therewith. The solution is evaporated and dried to provide a solid, yellow cake which is calcined at a temperature of from about 1000° to 1600°C, preferably about 1200° to 1500°C. The calcined material is ground to a fine particle size, so that it will all pass through a 100 mesh sieve, and preferably all less than 200 mesh. The finely ground, calcined powder can be formed by conventional ceramic forming techniques such as, for example, extrusion with an appropriate binder, dry pressing, isostatic pressing or the like. The formed body is then fired in an oxidizing atmosphere to a temperature of from about 1500° to 2300°C., preferably 1700° to 2100°C.

The resultant alkaline earth doped lanthanum chromite body prepared in such fashion will prove to have exceptionally high density, in excess of 90% of theoretical and, depending upon the forming technique employed, often in excess of 95% theoretical. Such densities result in the full attainment of the excellent potential properties, both mechanical and electrical, of the material. It is not clearly understood why the technique of the present invention provides such excellent results, but it is clear that the procedure is superior to other conventional processing techniques where densities of the order to about 60 to 75% of theoretical are attained. When contrasted with such conventional procedures, the product of the present invention, having densities in excess of 90% of theoretical, should provide exceptional performance when employed as electrodes for use in a magneto-hydrodynamic generator.

Lanthanum chromite compositions are well known in the art, as are strontium, calcium or magnesium doped lanthanum chromite formulations. It will suffice to those of ordinary skill in the art to point out that lanthanum chromite is generally prepared with a very slight excess of chromite, usually about 1.02 to 1.05 mole of chromium oxide per mole of lanthanum oxide. Strontium, calcium or magnesium doping can range from zero to thirty percent, depending upon the desired electrical properties, as is well known in the art. Such variations in formulations are conventional to those of ordinary skill in the art and form no part of the present invention.

The present invention will be more clearly understood with reference to the following examples which illustrate the best mode of practicing the invention but which should not be construed as limiting upon the scope of the invention.

EXAMPLE I

A batch of lanthanum chromite doped with 16% strontium was prepared by reacting the appropriate proportions lanthanum oxide ($La_2O_3$) and strontium carbonate ($SrCO_3$) in aqueous chromic acid, with high speed mixing. The resultant thick slurry was air dried and calcined to 1500°C. for 3 hours to form a dark brown-black cake. The calcined material was ground in a ball mill to less than 200 mesh, isostatically pressed at 15,000 psi and fired to 2000°C. for 3 hours. The resulting electrode was found to have a density about 97% of theoretical and exhibited excellent mechanical and electrical properties. The resistivity decreases from 1$\eta$cm at room temperature to 0.05$\eta$cm at 400°C. and remains substantially constant at this level at higher temperatures.

EXAMPLE II

In comparison, the same composition was formed into electrodes by different techniques to illustrate the superiority of the technique of the present invention:

a. A solution prepared as in Example I was dried, calcined at 1200°C. for 3 hours, isostatically pressed at 15,000 psi and fired to 1500°C. for 3 hours. The resulting electrode had a density 75% of theoretical.

b. Oxide powders were blended and ball milled to less than 200 mesh, isostatically pressed, and fired to 1500°C., resulting in an electrode having a density 60% of theoretical.

The electrodes prepared in accordance with the procedure of Example II, Parts a and b, were both deficient in electrical and mechanical properties and poorly suited to use in a magneto-hydrodynanic converter.

When prepared in accordance with the present invention, the electrode composition can be represented as $(La_{1-x}Y_x)CrO_3$, where $x = 0$ to 0.3. and Y is strontium, calcium or magnesium.

What is claimed:

1. A method for producing an electrode body having the composition $(La_{1-x} Sr_x) CrO_3$, $(La_{1-x} Ca_x) CrO_3$, $(La_{1-x} Mg_x) CrO_3$, or $La_1 Mg_x Cr_{1-x} O_3$, where $x = 0$ to $0.3$, and a density in excess of 90% of theoretical, comprising the steps of:
   a. forming an aqueous solution of chromic acid, and reacting lanthanum oxide and strontium, calcium or magnesium carbonate or hydroxides or oxides in proportions to provide the aforesaid composition; drying said thick slurry to a dry cake;
   c. calcining said dry cake to a temperature of about 1000° to 1600°C.;
   d. grinding the calcined cake to a powder of particle size of less than about 100 mesh;
   e. forming said powder to an electrode-shape; and
   f. firing said electrode shape in an oxidizing atmosphere to a temperature of about 1500° to 2300°C.

2. The method of claim 1 wherein said calcining is at a temperature of about 1200° to 1500°C.

3. The method of claim 1 wherein said grinding is to a particle size of less than about 200 mesh.

4. The method of claim 1 wherein said firing is at a temperature of about 1700° to 2100°C.

* * * * *